United States Patent
Miura

(10) Patent No.: US 8,311,719 B2
(45) Date of Patent: Nov. 13, 2012

(54) VEHICLE OPERATION DIAGNOSIS DEVICE, VEHICLE OPERATION DIAGNOSIS METHOD, AND COMPUTER PROGRAM

(75) Inventor: Naoki Miura, Toyokawa (JP)

(73) Assignee: Aisin Aw Co., Ltd., Anjo (JP)

( * ) Notice: Subject to any disclaimer, the term of this patent is extended or adjusted under 35 U.S.C. 154(b) by 375 days.

(21) Appl. No.: 12/656,828

(22) Filed: Feb. 17, 2010

(65) Prior Publication Data

US 2010/0250046 A1    Sep. 30, 2010

(30) Foreign Application Priority Data

Mar. 30, 2009   (JP) .................................. 2009-083083

(51) Int. Cl.
    *B60T 7/12* (2006.01)
(52) U.S. Cl. ......................................................... 701/96
(58) Field of Classification Search .................... 701/93, 701/96
    See application file for complete search history.

(56) References Cited

U.S. PATENT DOCUMENTS

| | | | |
|---|---|---|---|
| 5,684,473 A | | 11/1997 | Hibino et al. |
| 5,954,781 A | * | 9/1999 | Slepian et al. .................. 701/96 |
| 2009/0091439 A1 | | 4/2009 | Sekiyama et al. |

FOREIGN PATENT DOCUMENTS

| | | |
|---|---|---|
| EP | 2 012 268 A1 | 1/2009 |
| JP | A-6-247245 | 9/1994 |
| JP | A-11-125534 | 5/1999 |
| JP | A-2003-022498 | 1/2003 |
| JP | A-2004-139337 | 5/2004 |
| JP | A-2007-271959 | 10/2007 |
| JP | A-2007-293626 | 11/2007 |

OTHER PUBLICATIONS

Jun. 14, 2010 Office Action issued in European Patent Application No. 10 154 059.9.
Japanese Patent Office, Notification of Reason(s) for Refusal mailed Jun. 14, 2011 in Japanese Patent Application No. 2009-083083 w/Partial English-language Translation.

* cited by examiner

*Primary Examiner* — Michael McCullough
(74) *Attorney, Agent, or Firm* — Oliff & Berridge, PLC

(57) ABSTRACT

Vehicle operation diagnosis devices, methods, and programs diagnose a driver's vehicle operation in a vehicle that is provided with an inter-vehicular distance control system. When an inter-vehicular distance between the driver's own vehicle and a vehicle ahead that is moving forward ahead of the driver's own vehicle is within a specified distance, the inter-vehicular distance between the driver's own vehicle and the vehicle ahead is controlled by performing deceleration control of the driver's own vehicle. The devices, methods, and programs acquire a first driving parameter and a second driving parameter and diagnose the driver's vehicle operation based on a difference between the first driving parameter and the second driving parameter.

6 Claims, 5 Drawing Sheets

FIG. 2

| DRIVING DIAGNOSIS JUDGMENT STANDARD | DIAGNOSIS RESULT | GUIDANCE CONTENT |
|---|---|---|
| COMPUTED VALUE X IS LESS THAN A | ○ | APPROPRIATE INTER-VEHICULAR DISTANCE HAS BEEN ACHIEVED |
| COMPUTED VALUE X IS NOT LESS THAN A | × | ADJUST TO APPROPRIATE INTER-VEHICULAR DISTANCE |

32

$$X = \frac{\substack{\text{DISTANCE TRAVELED} \\ \text{WITH AUTOMATIC} \\ \text{DECELERATION CONTROL} \\ \text{BY DECELERATION INTER-} \\ \text{VEHICULAR DISTANCE} \\ \text{SYSTEM IN OPERATION}} - \substack{\text{DISTANCE TRAVELED WITH AUTOMATIC} \\ \text{DECELERATION CONTROL BY} \\ \text{DECELERATION INTER-VEHICULAR} \\ \text{DISTANCE SYSTEM IN OPERATION} \\ \text{ACCORDING TO FACTOR} \\ \text{BASED ON VEHICLE AHEAD}}}{\substack{\text{DISTANCE TRAVELED AT NOT LESS THAN OPERATION CONDITION} \\ \text{SPEED OF DECELERATION INTER-VEHICULAR DISTANCE SYSTEM}}}$$

VEHICLE OPERATION DIAGNOSIS DEVICE, VEHICLE OPERATION DIAGNOSIS METHOD, AND COMPUTER PROGRAM

INCORPORATION BY REFERENCE

The disclosure of Japanese Patent Application No. 2009-083083 filed on Mar. 30, 2009, including the specification, drawings and abstract is incorporated herein by reference in its entirety.

BACKGROUND OF THE INVENTION

1. Field of the Invention

The present invention relates to a vehicle operation diagnosis device, a vehicle operation diagnosis method, and a computer program that diagnose operation of a vehicle by a driver.

2. Description of the Related Art

In recent years, systems have become known that diagnose whether a driver's operation of a vehicle while driving is appropriate or not in terms of safety, in order to improve the driver's safe driving skills and to encourage the driver's interest in safe driving. For example, in Japanese Patent Application Publication No. JP-A-2007-293626, a system is described that determines whether or not a user is performing safe driving, based on diagnosis judgment standards that are set for a plurality of diagnosis items, such as an inter-vehicular distance, a speed limit, a temporary stop, a deceleration before a curve, and the like. In a case where it is determined that the user is performing safe driving, the system assigns a point value. Note that processing is described whereby, in a case where the diagnosis is specifically performed with respect to the inter-vehicular distance, the user is judged to be performing safe driving if the relationship between the inter-vehicular distance and the vehicle speed is such that a fixed time interval is maintained between the user's own vehicle and a vehicle that is traveling ahead.

Furthermore, by referring to a result of the system's diagnosis, the driver can learn the characteristics of his own vehicle operation and what sorts of vehicle operation are appropriate under various circumstances. The driver can then perform safer and more appropriate vehicle operation by correcting the way he operates the brakes, the accelerator, the steering wheel, and the like based on what he has learned. The system can also give the driver motivation to continue driving safely.

Moreover, in recent years, inter-vehicular distance control systems have been proposed for automatically controlling the inter-vehicular distance between the user's own vehicle and a vehicle that is traveling ahead (for example, Japanese Patent Application Publication No. JP-A-6-247245). These sorts of inter-vehicular distance control systems include, for example, a (conforming type) system that automatically performs acceleration and deceleration control of the user's own vehicle such that its speed conforms to the speed of the vehicle ahead, a (deceleration control type) system that performs deceleration control only in a case where the distance to the vehicle ahead is not greater than a specified distance and the speed of the user's own vehicle is greater than the speed of the vehicle ahead, and the like. The inter-vehicular distance control systems also include a system that, in a case where the inter-vehicular distance between the user's own vehicle and the vehicle ahead has become too short, maintains a fixed inter-vehicular distance by performing deceleration control of the user's own vehicle. However, even in cases where these inter-vehicular distance control systems are used, it is not possible to completely prevent contact between the user's own vehicle and the vehicle ahead, and there is a need to make the driver more aware of safety with respect to the inter-vehicular distance.

SUMMARY OF THE INVENTION

In the system that is described in Japanese Patent Application Publication No. JP-A-2007-293626, in a case where the diagnosis is performed with respect to the inter-vehicular distance, the diagnosis result is determined with only the inter-vehicular distance between the user's own vehicle and the vehicle ahead serving as the judgment standard, and factors that pertain to whether the inter-vehicular distance has become too short are not taken into account. Specifically, the same sort of diagnosis that safe driving is not being performed is made both in a case where the inter-vehicular distance has become too short due to a factor that is based on the vehicle ahead (for example, the vehicle ahead has decelerated or the like) and in a case where the inter-vehicular distance has become too short due to a factor that is based on the user's own vehicle (for example, the user's own vehicle has accelerated or the like).

However, even in a case where the inter-vehicular distance has become too short due to a factor that is based on the vehicle ahead, if the diagnosis is made that safe driving is not being performed, the negative diagnosis result is determined even though the driver of the user's own vehicle has done nothing wrong, so it is impossible to evaluate the driver's vehicle operation appropriately. It is also impossible to give the driver motivation to continue driving safely.

The present invention was devised to address the known problems described above and provides a vehicle operation diagnosis device, a vehicle operation diagnosis method, and a computer program that, when performing diagnosis of the vehicle operation of the driver with respect to the inter-vehicular distance in a vehicle in which an inter-vehicular distance control system is installed for controlling the inter-vehicular distance between the user's own vehicle and the vehicle ahead, excludes from the diagnosis a case where a deceleration control has operated due to a factor that is based on the vehicle ahead, thus making it possible to evaluate appropriately, in terms of safety, the vehicle operation of the driver with respect to the inter-vehicular distance, and also making it possible to give the driver motivation to continue driving safely.

In order to address the known problems, a vehicle operation diagnosis device according to a first aspect of the present invention diagnoses a driver's vehicle operation in a vehicle that is provided with an inter-vehicular distance control system that, in a case where an inter-vehicular distance between the driver's own vehicle and a vehicle ahead that is moving forward ahead of the driver's own vehicle is within a specified distance, controls the inter-vehicular distance between the driver's own vehicle and the vehicle ahead by performing deceleration control of the driver's own vehicle. The vehicle operation diagnosis device includes a first driving parameter acquisition unit, a second driving parameter acquisition unit, and a vehicle operation diagnosis unit. The first driving parameter acquisition unit acquires a first driving parameter when the driver's own vehicle has traveled in a state in which the deceleration control by the inter-vehicular distance control system was in operation. The second driving parameter acquisition unit acquires a second driving parameter when the driver's own vehicle has traveled in a state in which the deceleration control by the inter-vehicular distance control system was in operation based on the inter-vehicular distance between the driver's own vehicle and the vehicle ahead being within the specified distance in accordance with a factor that is based on the vehicle ahead. The vehicle operation diagnosis unit diagnoses the driver's vehicle operation based on a difference between the first driving parameter and the second driving parameter.

Note that the case in which the deceleration control by the inter-vehicular distance system is operated in accordance with the factor that is based on the vehicle ahead corresponds to a case in which, for example, the vehicle ahead has decelerated, stopped, or the like while the driver's own vehicle is in a state of traveling at a constant speed.

Further, the driving parameters may be, for example, distances traveled, lengths of time spent traveling, numbers of times that the driver's own vehicle has traveled, and the like.

A vehicle operation diagnosis device according to a second aspect of the present invention is the vehicle operation diagnosis device that is described in the first aspect, with the vehicle operation diagnosis unit including a ratio computation unit that computes a ratio of the difference between a first driving distance as the first driving parameter and a second driving distance as the second driving parameter to a distance that the driver's own vehicle has traveled under a specified condition, and with the vehicle operation diagnosis unit diagnosing the driver's vehicle operation based on the ratio that is computed by the ratio computation unit.

A vehicle operation diagnosis device according to a third aspect of the present invention is the vehicle operation diagnosis device that is described in the first aspect, with the vehicle operation diagnosis unit including a ratio computation unit that computes a ratio of the difference between a first driving length of time as the first driving parameter and a second driving length of time as the second driving parameter to a length of time that the driver's own vehicle has traveled under a specified condition, and with the vehicle operation diagnosis unit diagnosing the driver's vehicle operation based on the ratio that is computed by the ratio computation unit.

A vehicle operation diagnosis device according to a fourth aspect of the present invention is the vehicle operation diagnosis device that is described in the first aspect, with the vehicle operation diagnosis unit including a ratio computation unit that computes a ratio of the difference between a first driving number of times as the first driving parameter and a second driving number of times as the second driving parameter to a number of times that the driver's own vehicle has traveled under a specified condition, and with the vehicle operation diagnosis unit diagnosing the driver's vehicle operation based on the ratio that is computed by the ratio computation unit.

A vehicle operation diagnosis device according to a fifth aspect of the present invention is the vehicle operation diagnosis device that is described in any one of the second to the fourth aspect, with the inter-vehicular distance control system executing the deceleration control on the condition that the driver's own vehicle is traveling at not less than a specified speed, and the specified condition being that the driver's own vehicle has traveled at not less than the specified speed.

A vehicle operation diagnosis device according to a sixth aspect of the present invention is the vehicle operation diagnosis device that is described in any one of the first to the fifth aspect, also including a diagnosis result guidance unit that provides guidance with respect to a result of the diagnosis of the driver's vehicle operation by the vehicle operation diagnosis unit.

A vehicle operation diagnosis method according to a seventh aspect of the present invention diagnoses a driver's vehicle operation in a vehicle that is provided with an inter-vehicular distance control system that, in a case where an inter-vehicular distance between the driver's own vehicle and a vehicle ahead that is moving forward ahead of the driver's own vehicle is within a specified distance, controls the inter-vehicular distance between the driver's own vehicle and the vehicle ahead by performing deceleration control of the driver's own vehicle. The vehicle operation diagnosis method includes a step of acquiring a first driving parameter when the driver's own vehicle has traveled in a state in which the deceleration control by the inter-vehicular distance control system was in operation. The vehicle operation diagnosis method also includes a step of acquiring a second driving parameter when the driver's own vehicle has traveled in a state in which the deceleration control by the inter-vehicular distance control system was in operation based on the inter-vehicular distance between the driver's own vehicle and the vehicle ahead being within the specified distance in accordance with a factor that is based on the vehicle ahead. The vehicle operation diagnosis method also includes a step of diagnosing the driver's vehicle operation based on a difference between the first driving parameter and the second driving parameter.

A computer program according to an eighth aspect is installed in a computer and diagnoses a driver's vehicle operation in a vehicle that is provided with an inter-vehicular distance control system that, in a case where an inter-vehicular distance between the driver's own vehicle and a vehicle ahead that is moving forward ahead of the driver's own vehicle is within a specified distance, controls the inter-vehicular distance between the driver's own vehicle and the vehicle ahead by performing deceleration control of the driver's own vehicle. The computer program causes the computer to perform a function of acquiring a first driving parameter when the driver's own vehicle has traveled in a state in which the deceleration control by the inter-vehicular distance control system was in operation. The computer program also causes the computer to perform a function of acquiring a second driving parameter when the driver's own vehicle has traveled in a state in which the deceleration control by the inter-vehicular distance control system was in operation based on the inter-vehicular distance between the driver's own vehicle and the vehicle ahead being within the specified distance in accordance with a factor that is based on the vehicle ahead. The computer program also causes the computer to perform a function of diagnosing the driver's vehicle operation based on a difference between the first driving parameter and the second driving parameter.

In the vehicle operation diagnosis device according to the first aspect, having the configuration that is described above, when the driver's vehicle operation with respect to the inter-vehicular distance is diagnosed in the vehicle that is provided with the inter-vehicular distance control system for controlling the inter-vehicular distance between the driver's own vehicle and the vehicle ahead, the case in which the deceleration control is operated in accordance with the factor that is based on the vehicle ahead is excluded from the diagnosis, so it is possible to evaluate appropriately, in terms of safety, the driver's operation of the vehicle with respect to the inter-vehicular distance. It is also possible to give the driver motivation to continue driving safely.

Further, in the vehicle operation diagnosis device according to the second aspect, the diagnosis of the driver's vehicle operation is performed using the ratio of the distance over which the deceleration control was in operation based on the factor of the driver's own vehicle to the distance that the driver's own vehicle traveled under the specified condition, so it is possible to evaluate the driver's operation of the vehicle appropriately and to prevent a negative diagnosis result from being determined in spite of the fact that the driver of the vehicle has done nothing wrong.

Furthermore, in the vehicle operation diagnosis device according to the third aspect, the diagnosis of the driver's vehicle operation is performed using the ratio of the length of time during which the deceleration control was in operation based on the factor of the driver's own vehicle to the length of time that the driver's own vehicle traveled under the specified condition, so it is possible to evaluate the driver's operation of the vehicle appropriately and to prevent a negative diagnosis result from being determined in spite of the fact that the driver of the vehicle has done nothing wrong.

Moreover, in the vehicle operation diagnosis device according to the fourth aspect, the diagnosis of the driver's vehicle operation is performed using the ratio of the number of times that the deceleration control was operated based on the factor of the driver's own vehicle to the number of times that the driver's own vehicle traveled under the specified condition, so it is possible to evaluate the driver's operation of the vehicle appropriately and to prevent a negative diagnosis result from being determined in spite of the fact that the driver of the vehicle has done nothing wrong.

Additionally, in the vehicle operation diagnosis device according to the fifth aspect, the diagnosis of the driver's vehicle operation is performed using the ratio of the parameter when the deceleration control was in operation based on the factor of the driver's own vehicle to the parameter when the driver's own vehicle traveled in a state in which the deceleration control by the deceleration control type of inter-vehicular distance control system can be operated, so it is possible to evaluate the driver's operation of the vehicle appropriately and to prevent a negative diagnosis result from being determined in spite of the fact that the driver of the vehicle has done nothing wrong.

Further, in the vehicle operation diagnosis device according to the sixth aspect, providing guidance to the driver with respect to the diagnosis result makes it possible to make the driver more conscious of highly safe vehicle operation and to give the driver motivation to continue driving safely.

Furthermore, in the vehicle operation diagnosis method according to the seventh aspect, when the driver's vehicle operation with respect to the inter-vehicular distance is diagnosed in the vehicle that is provided with the inter-vehicular distance control system for controlling the inter-vehicular distance between the driver's own vehicle and the vehicle ahead, the case in which the deceleration control is operated in accordance with the factor that is based on the vehicle ahead is excluded from the diagnosis, so it is possible to evaluate appropriately, in terms of safety, the driver's operation of the vehicle with respect to the inter-vehicular distance. It is also possible to give the driver motivation to continue driving safely.

Moreover, when the computer program according to the eighth aspect causes a computer to diagnose the driver's vehicle operation with respect to the inter-vehicular distance in the vehicle that is provided with the inter-vehicular distance control system for controlling the inter-vehicular distance between the driver's own vehicle and the vehicle ahead, the case in which the deceleration control is operated in accordance with the factor that is based on the vehicle ahead is excluded from the diagnosis, so it is possible to evaluate appropriately, in terms of safety, the driver's operation of the vehicle with respect to the inter-vehicular distance. It is also possible to give the driver motivation to continue driving safely.

BRIEF DESCRIPTION OF THE DRAWINGS

FIG. 2 is a format diagram that shows an example of a vehicle operation diagnosis determination table;

DETAILED DESCRIPTION OF THE EMBODIMENTS

Figure 1:
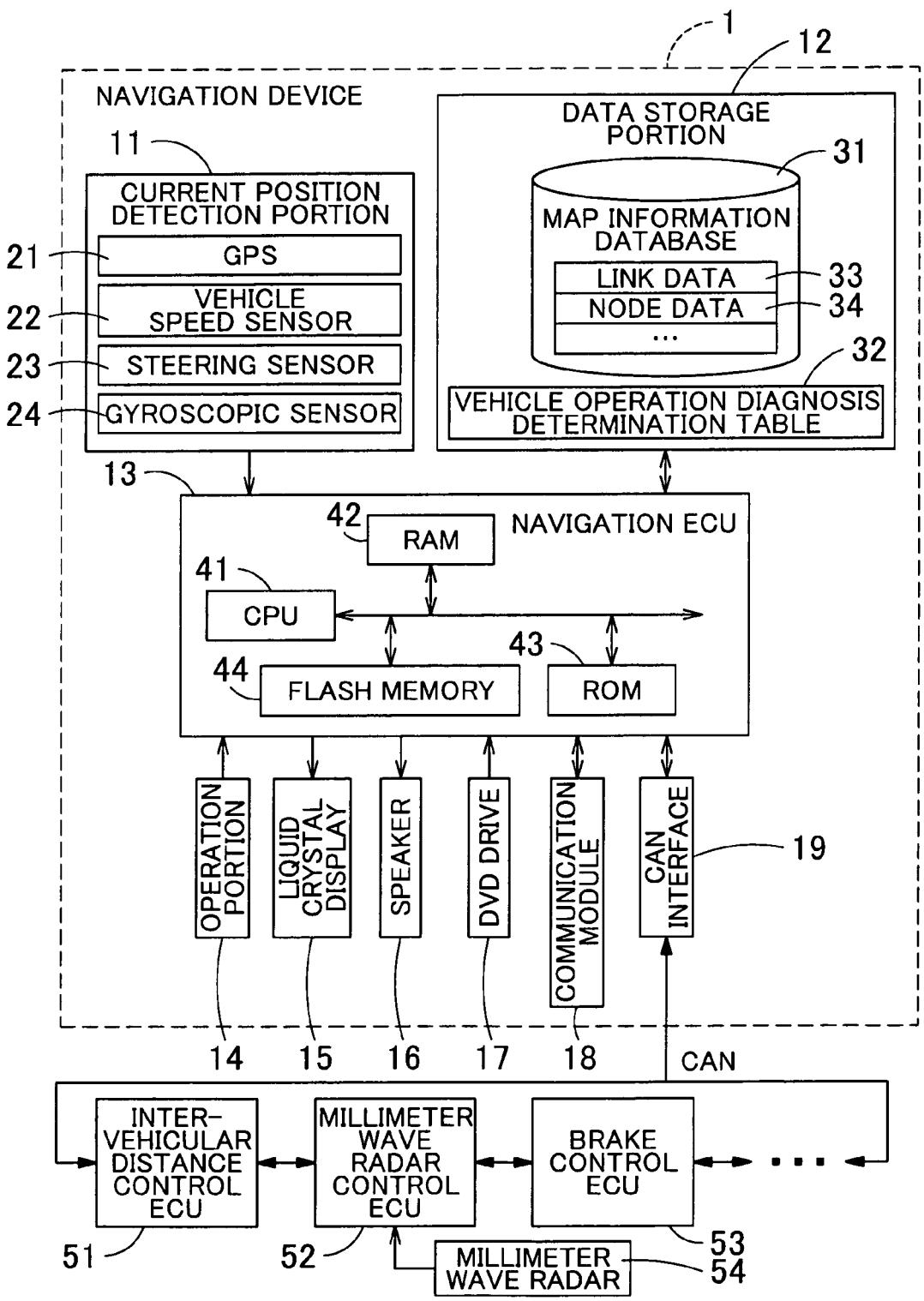
FIG. 1 is a block diagram that shows a navigation device according to an embodiment.

Hereinafter, a vehicle operation diagnosis device according to the present invention will be explained in detail with reference to the drawings, based on an embodiment that is implemented in a navigation device. First, a schematic configuration of a navigation device 1 according to the present embodiment will be explained using FIG. 1. FIG. 1 is a block diagram that shows the navigation device 1 according to the present embodiment.

As shown in FIG. 1, the navigation device 1 is configured from a current position detection portion 11, a data storage portion 12, a navigation ECU 13, an operation portion 14, a liquid crystal display 15, a speaker 16, a DVD drive 17, a communication module 18, and a controller area network (CAN) interface 19. The current position detection portion 11 detects the current position of a vehicle. The data storage portion 12 stores various types of data. The navigation ECU 13 (a first driving parameter acquisition unit, a second driving parameter acquisition unit, a vehicle operation diagnosis unit, a ratio computation unit, a diagnosis result guidance unit) performs various types of computational processing based on information that is input. The operation portion 14 accepts an operation from a user. The liquid crystal display 15 displays for the user a map and various types of information that pertain to guidance and the like for the result of the diagnosis of a driver's operation of the vehicle. The speaker 16 outputs voice guidance that is related to route guidance. The DVD drive 17 reads a DVD that is a storage medium in which a program is stored. The communication module 18 performs communication with an information center such as a traffic information center or the like.

Hereinafter, the various configuring elements that configure the navigation device 1 will be explained in order.

The current position detection portion 11 includes a GPS 21, a vehicle speed sensor 22, a steering sensor 23, a gyroscopic sensor 24, an altimeter (not shown in the drawings), and the like, and it is capable of detecting the current position and heading of the vehicle, the travel speed of the vehicle, and the like. The vehicle speed sensor 22, in particular, is a sensor for detecting the vehicle speed and the distance that the vehicle travels. The vehicle speed sensor 22 generates pulses in accordance with the revolution of a wheel of the vehicle and outputs a pulse signal to the navigation ECU 13. The navigation ECU 13 then computes the revolution speed of the wheel and the distance that the vehicle travels by counting the generated pulses. Note that it is not necessary for the navigation device 1 to be provided with all of the four types of sensors that are described above, and that the navigation device 1 may also be configured such that it is provided with as few as one type of sensor.

The data storage portion 12 is provided with a hard disk (not shown in the drawings) that serves as an external storage device and a storage medium, and with a read-write head (not shown in the drawings) serving as a drive for reading a map information database DB31, a vehicle operation diagnosis determination table 32, a specified program, and the like that are stored on the hard disk, as well as for writing specified data to the hard disk.

Various types of map data that are required for route guidance, traffic information guidance, and map displays are stored in the map information database DB31.

The map data are specifically configured from link data 33 that pertain to the shapes of roads (links), node data 34 that pertain to node points, POI data that provide information pertaining to locations such as facilities and the like, intersection data that pertain to various intersections, search data for searching for a route, search data for searching for a location, image drawing data for drawing images of maps, roads, traffic information, and the like on the liquid crystal display 15, and the like.

The vehicle operation diagnosis determination table 32 is used in diagnosing whether or not a vehicle operation that the driver performs while driving is appropriate in terms of safety when processing that makes that diagnosis (hereinafter called vehicle operation diagnosis processing) is executed. Note that in the present embodiment, the vehicle operation diagnosis processing particularly makes a diagnosis with respect to a vehicle operation that adjusts the inter-vehicular distance in relation to the vehicle ahead.

Driving diagnosis judgment standards set for a diagnosis item (inter-vehicular distance diagnosis in the present embodiment), diagnosis results, and the content of guidance that is provided based on the diagnosis result are stored in association with one another in the vehicle operation diagnosis determination table 32. In the vehicle operation diagnosis processing, the navigation ECU 13 compares a vehicle operation that is executed with the driving diagnosis judgment standards that are set for each of the diagnosis items, then determines the diagnosis result based on whether or not the vehicle operation that is executed meets the driving diagnosis judgment standards. The navigation ECU 13 then provides guidance in the form of a message that corresponds to the determined diagnosis result.

Hereinafter, the vehicle operation diagnosis processing will be explained more concretely using FIG. 2. FIG. 2 is a figure that shows an example of the vehicle operation diagnosis determination table 32.

As shown in FIG. 2, in the vehicle operation diagnosis processing, the navigation ECU 13 computes a ratio X by subtracting a "distance traveled by the user's own vehicle with an automatic deceleration control by a deceleration control type of inter-vehicular distance control system (hereinafter called the deceleration inter-vehicular distance system) in operation according to a factor that is based on the vehicle ahead" from a "distance traveled with the automatic deceleration control by the deceleration inter-vehicular distance system in operation" and dividing the result by a "distance traveled at not less than an operation condition speed of the deceleration inter-vehicular distance system". In other words, the ratio X indicates the ratio of the distance over which the automatic deceleration control by the deceleration inter-vehicular distance system is in operation according to a factor that is based on the user's own vehicle to the distance that the user's own vehicle travels in a state in which the automatic deceleration control by the deceleration inter-vehicular distance system can be in operation.

Then, in a case where the computed ratio X is less than a specified ratio A (for example, ten percent), the navigation ECU 13 diagnoses that the vehicle is being driven safely and provides guidance saying that an appropriate inter-vehicular distance has been achieved, so that the driver will evaluate his driving as safe. In contrast, in a case where the computed ratio X is not less than the specified ratio A (for example, ten percent), the navigation ECU 13 diagnoses that the vehicle is not being driven safely and provides guidance telling the driver to adjust to an appropriate inter-vehicular distance in order to encourage safe driving. Here, the deceleration control type of inter-vehicular distance control system (the deceleration inter-vehicular distance system) is a type of inter-vehicular distance control system that ensures a fixed inter-vehicular distance by performing automatic deceleration control of the user's own vehicle in a case where the inter-vehicular distance between the user's own vehicle and the vehicle ahead is within a specified distance and the travel speed of the user's own vehicle is greater than that of the vehicle ahead. The operation condition speed of the deceleration inter-vehicular distance system is a speed of the user's own vehicle that is one condition for the operation of the automatic deceleration control by the deceleration inter-vehicular distance system, and the speed of the user's own vehicle being not less than the operation condition speed serves as one condition for the operation of the automatic deceleration control by the deceleration inter-vehicular distance system. Note that the deceleration inter-vehicular distance system will be explained in detail later.

Note that in the vehicle operation diagnosis processing, a diagnosis as to whether a speed limit is being observed, a diagnosis as to whether the vehicle is decelerating before reaching a temporary stop line, and the like may be performed in addition to the diagnosis of the inter-vehicular distance that is described above.

The navigation ECU 13 is an electronic control unit that performs overall control of the navigation device 1 by executing guidance route setting processing that, in a case where a destination has been selected, sets a guidance route from the current position to the destination, the vehicle operation diagnosis processing that diagnoses whether or not a vehicle operation that the driver performs while driving is appropriate in terms of safety, and the like. The navigation ECU 13 is provided with a CPU 41 that serves as a computing device and a control device, as well as with internal storage devices such as a RAM 42, a ROM 43, a flash memory 44, and the like. The RAM 42 is used as a working memory when the CPU 41 executes various types of computational processing, and it also stores route data and the like when a search for a route is conducted. A control program, a deceleration control distance computation processing program (refer to FIG. 4), a vehicle operation diagnosis processing program (refer to FIG. 5), and the like are stored in the ROM 43. The flash memory 44 stores a program that is read from the ROM 43.

The operation portion 14 is operated when a departure point is input as a driving start point and when a destination is input as a driving end point, and it is configured from a plurality of operation switches (not shown in the drawings), such as various types of keys, buttons, and the like. Based on switch signals that are output by pressing or otherwise operating the various switches, the navigation ECU 13 performs control such that the corresponding types of operations are executed. Note that the operation portion 14 can also be configured as a touch panel that is provided on the front face of the liquid crystal display 15.

A map image that includes a road, traffic information, operation guidance, an operation menu, key guidance, the guidance route from the departure point to the destination, guidance information along the guidance route, news, a weather forecast, the time, e-mail, a television program, and the like are also displayed on the liquid crystal display 15. In a case where the diagnosis of the driver's operation of the vehicle has been performed, the diagnosis result is also displayed.

The speaker 16, based on a command from the navigation ECU 13, outputs voice guidance that guides driving along the guidance route and traffic information guidance. In a case where the diagnosis of the driver's operation of the vehicle has been performed, the speaker 16 provides voice guidance regarding the diagnosis result.

The DVD drive 17 is a drive that is capable of reading data that are stored in a storage medium such as a DVD, a CD, or the like. An update of the map information database DB31 and the like are performed based on the data that are read.

The communication module 18 is a communication device for receiving traffic information that includes various types of information, such as congestion information, regulation information, traffic accident information, and the like, and that is transmitted from a traffic information center, such as a Vehicle Information and Communication System (VICS (registered trademark)) center, a probe center, or the like, for example. The communication module 18 is equivalent to a mobile telephone and a DCM, for example.

The CAN interface 19 is an interface that executes input and output of data in relation to a CAN, which is an in-vehicle network for carrying out multiplex communications among various types of control ECUs that are installed in the vehicle. Through the CAN, the navigation ECU 13 is connected, in such a way that mutual communication is possible, to various types of control ECUs that control the vehicle (for example, an inter-vehicular distance control ECU 51, a millimeter wave radar control ECU 52, a brake control ECU 53, and the like). The navigation ECU 13 also performs the diagnosis of the driver's operation of the vehicle, which is described later, based on various types of data (the operating state of the automatic deceleration control by the deceleration inter-vehicular distance system and the like) that are acquired from the various types of ECUs through the CAN.

Next, the inter-vehicular distance control ECU 51, the millimeter wave radar control ECU 52, and the brake control ECU 53 among the various types of control ECUs that are connected through the CAN will be explained.

The inter-vehicular distance control ECU 51 is an electronic control unit that implements inter-vehicular distance control by the deceleration inter-vehicular distance system. The millimeter wave radar control ECU 52 is an electronic control unit that is connected to a millimeter wave radar 54 and that uses the millimeter wave radar 54 to perform measurements of the position of an obstacle (the vehicle ahead) and its speed in relation to the user's own vehicle. The brake control ECU 53 is an electronic control unit that performs brake control for the vehicle. Note that the inter-vehicular distance control ECU 51, the millimeter wave radar control ECU 52, and the brake control ECU 53 each include a CPU, a RAM, a ROM, and the like that are not shown in the drawings. The inter-vehicular distance control ECU 51, along with the millimeter wave radar control ECU 52, the brake control ECU 53, and the millimeter wave radar 54, configures the deceleration inter-vehicular distance system. Note that the deceleration inter-vehicular distance system will be explained in detail later.

The millimeter wave radar 54 is an obstacle detection sensor that is mounted close to the upper center portion of the license plate that is mounted on the front of the vehicle, and its range of detection is a specified range in the vicinity of the vehicle (for example, within 100 meters ahead of the vehicle). The millimeter wave radar 54 is configured from a radio transmission portion and a radio receiving portion, and it outputs millimeter waves and receives radio waves that are reflected by an obstacle. The millimeter wave radar control ECU 52 measures the position of the obstacle (the vehicle ahead) and its speed in relation to the user's own vehicle. Note that an infrared beam sensor and a pair of CCD cameras may also be used instead of the millimeter wave radar 54.

Figure 3:
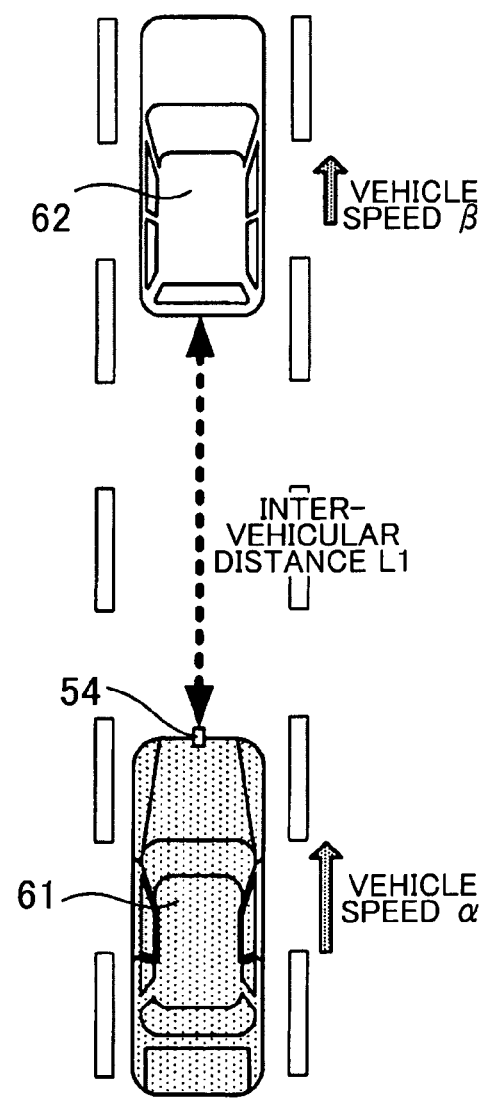
FIG. 3 is a figure that explains a system that controls inter-vehicular distance in accordance with a deceleration inter-vehicular distance system.

Next, the deceleration control type of inter-vehicular distance control system (the deceleration inter-vehicular distance system) will be explained using FIG. 3.

The deceleration inter-vehicular distance system is a system that, in a case where a vehicle ahead 62 is traveling in the same lane as an own vehicle 61, implements automatic deceleration control in order to maintain an inter-vehicular distance L1 between the own vehicle 61 and the vehicle ahead 62 at an appropriate distance. The deceleration inter-vehicular distance system according to the present embodiment executes the processing that starts at (1) below in a case where the following three conditions have been satisfied: (A) a system operation switch (not shown in the drawings) has been operated by the user, and the deceleration inter-vehicular distance system function has been turned on; (B) the millimeter wave radar 54 has detected the vehicle ahead 62 has been detected ahead of the own vehicle 61; and (C) a vehicle speed a of the own vehicle 61 is not less than the specified operation condition speed (for example, 50 km/h).

(1) First, the millimeter wave radar control ECU 52 measures the inter-vehicular distance L1 between the own vehicle 61 and the vehicle ahead 62 and measures the speed of the vehicle ahead 62 in relation to the own vehicle 61.

(2) Next, the millimeter wave radar control ECU 52 transmits the measured values through the CAN to the inter-vehicular distance control ECU 51.

(3) Next, in a case where the inter-vehicular distance L1 is within a set inter-vehicular distance that is set in advance (for example, the distance that the own vehicle 61 travels in one second) and the own vehicle 61 is traveling at a speed that is greater than that of the vehicle ahead 62 ($\alpha$ is greater than $\beta$), the inter-vehicular distance control ECU 51, having received the measured values, starts the automatic deceleration control of the own vehicle 61.

(4) Once the automatic deceleration control has started, first, the inter-vehicular distance control ECU 51, based on the inter-vehicular distance L1 and the relative speed with respect to the vehicle ahead 62, computes a target deceleration for ensuring the set inter-vehicular distance from the vehicle ahead 62. In a case where the accelerator pedal is being depressed, the accelerator angle is set of the zero.

(5) Thereafter, a determination is made, based on the inter-vehicular distance L1 and the relative speed, as to whether or not the brake control that will henceforth be performed is unnecessary for the own vehicle 61.

(6) Then, in a case where it is determined that the brake control is not unnecessary, a maximum supported deceleration (the equivalent of engine braking by downshifting, for example, 0.07 G) is determined based on the current vehicle speed $\alpha$ of the own vehicle 61 and on the target deceleration, and the brake control is implemented within the range of the maximum supported deceleration. Note that the brake control is implemented through the brake control ECU 53.

(7) Thereafter, when the own vehicle 61 is decelerated to the target deceleration, the automatic deceleration control is terminated. The automatic deceleration control is also terminated in a case where the deceleration inter-vehicular distance system function has been turned off by an operation by the user.

Figure 4:
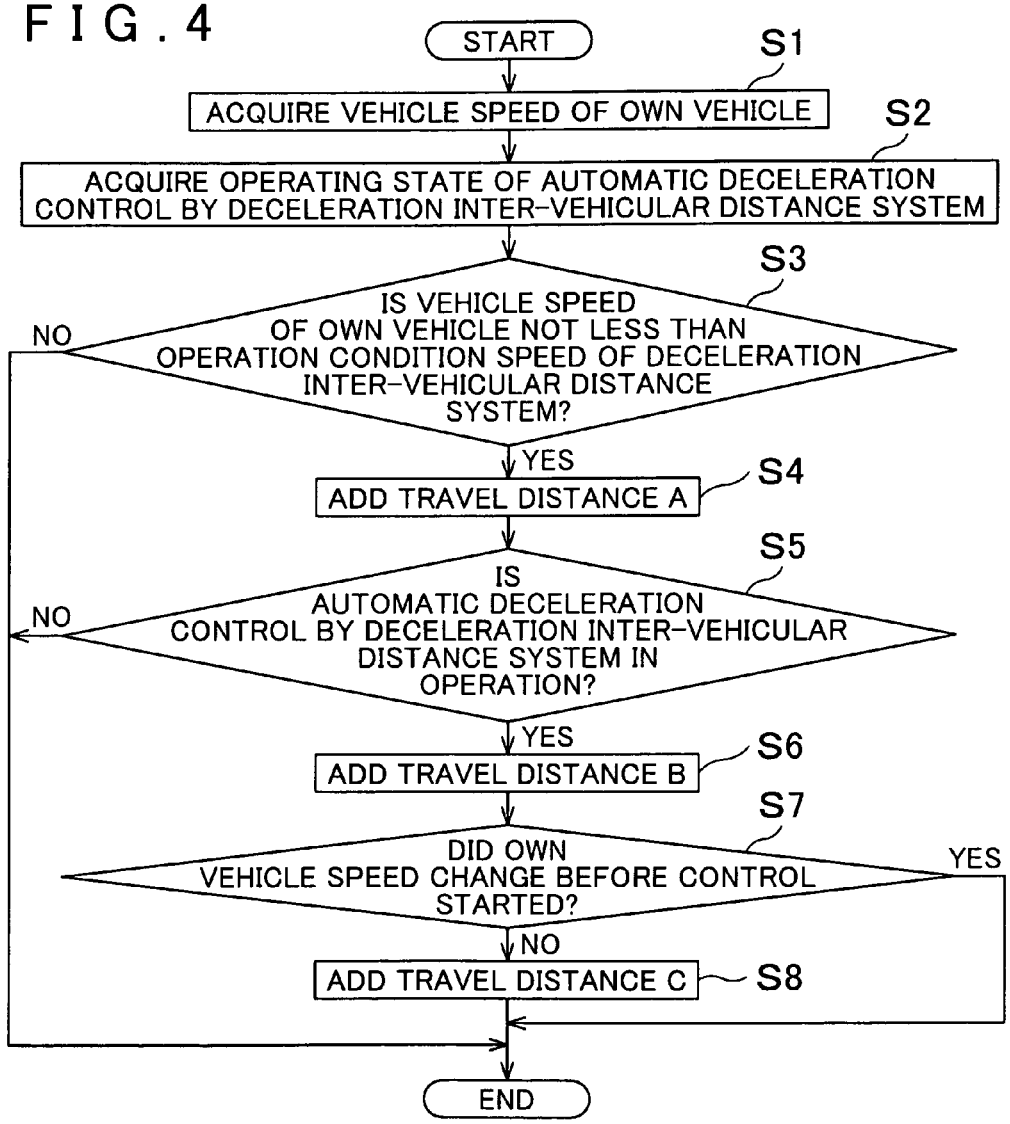
FIG. 4 is a flowchart of a deceleration control distance computation processing program according to the present embodiment.
Figure 5:
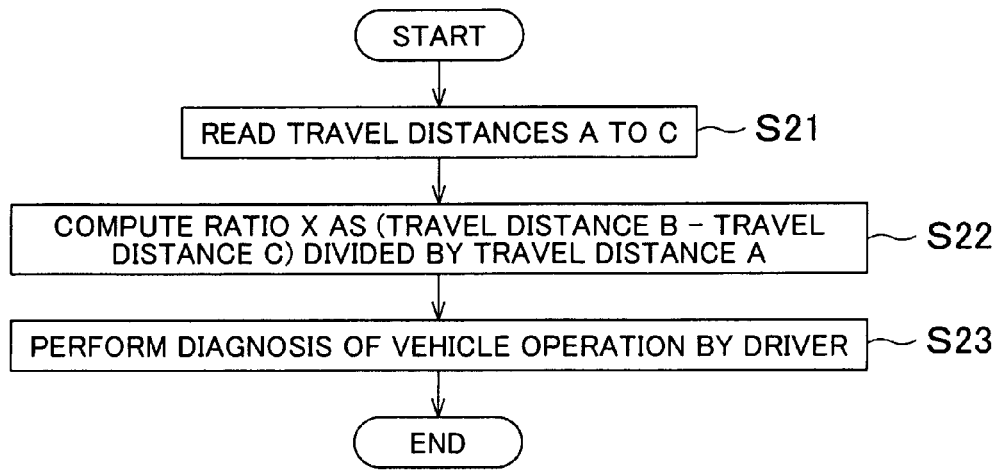
FIG. 5 is a flowchart of a vehicle operation diagnosis processing program according to the present embodiment.

Next, the deceleration control distance computation processing program that is executed in the navigation device 1 that has the configuration that is described above will be explained based on FIG. 4. FIG. 4 is a flowchart of the deceleration control distance computation processing program according to the present embodiment. The deceleration control distance computation processing program is a program that is executed at specified time intervals (for example, once per second) after the vehicle's adaptive cruise control is turned on, and for each factor, it measures the distance that the own vehicle 61 travels with the automatic deceleration control by the deceleration inter-vehicular distance system in operation. Note that the programs that are shown in the flowcharts in FIGS. 4 and 5 are stored in the RAM 42, the ROM 43, or the like that are provided in the navigation ECU 13, and are executed by the CPU 41.

In the deceleration control distance computation processing program, first, at step (hereinafter abbreviated as S) 1, the CPU 41 acquires the current vehicle speed of the own vehicle 61 based on the detection result from the vehicle speed sensor 22.

Next, at S2, the CPU 41 acquires, from the inter-vehicular distance control ECU 51 through the CAN, the operating state of the automatic deceleration control by the deceleration inter-vehicular distance system. Note that the automatic deceleration control by the deceleration inter-vehicular distance system is started in a case where the conditions (A) to (C) that are described above are met, the inter-vehicular distance L1 between the own vehicle 61 and the vehicle ahead 62 is within the set inter-vehicular distance that is set in advance (for example, the distance that the own vehicle 61 travels in one second), and the own vehicle 61 is traveling at a speed that is greater than that of the vehicle ahead 62. Further, the automatic deceleration control by the deceleration inter-vehicular distance system is terminated when the own vehicle 61 is decelerated to the target deceleration for ensuring the set inter-vehicular distance between the own vehicle 61 and the vehicle ahead 62. The automatic deceleration control is also terminated in a case where the deceleration inter-vehicular distance system function has been turned off by an operation by the user.

Next, at S3, the CPU 41 determines whether or not the vehicle speed of the own vehicle 61 that was acquired at S1 is not less than the operation condition speed (for example, 50 km/h) of the deceleration inter-vehicular distance system. Note that the operation condition speed of the deceleration inter-vehicular distance system is the speed of the own vehicle 61 that is one condition for the operation of the automatic deceleration control by the deceleration inter-vehicular distance system, and the speed of the own vehicle 61 being not less than the operation condition speed serves as one condition for the operation of the automatic deceleration control by the deceleration inter-vehicular distance system.

In a case where it is determined that the speed of the own vehicle 61 is not less than the operation condition speed (YES at S3), the processing advances to S4. In contrast, in a case where it is determined that the speed of the own vehicle 61 is less than the operation condition speed (NO at S3), the deceleration control distance computation processing program is terminated.

Then, at S4, the CPU 41 computes a distance S that has been traveled by the own vehicle 61 since the previous time that the deceleration control distance computation processing program was executed. The CPU 41 also reads a travel distance A, which is a variable, from the RAM 42 and adds the computed travel distance S to the value of the travel distance A that it has read. The CPU 41 then stores once again in the RAM 42 the travel distance A to which the travel distance S has been added. Note that the travel distance A indicates the cumulative value of the distances that the own vehicle 61 has traveled at a speed that is not less than the operation condition speed of the deceleration inter-vehicular distance system. The travel distance A is initialized when the deceleration control distance computation processing program is executed for the first time and when a specified operation by the user has been accepted by the operation portion 14.

Next, at S5, the CPU 41 determines whether or not the automatic deceleration control by the deceleration inter-vehicular distance system is currently in operation in the own vehicle 61, based on the operating state of the automatic deceleration control by the deceleration inter-vehicular distance system that was acquired at S2.

In a case where it is determined that the automatic deceleration control by the deceleration inter-vehicular distance system is currently in operation in the own vehicle 61 (YES at S5), the processing advances to S6. In contrast, in a case where it is determined that the automatic deceleration control by the deceleration inter-vehicular distance system is not currently in operation in the own vehicle 61 (NO at S5), the deceleration control distance computation processing program is terminated.

Next, at S6, the CPU 41 reads a travel distance B, which is a variable, from the RAM 42, then adds to the value of the travel distance B that it has read the distance S that the own vehicle 61 has traveled since the previous time that the deceleration control distance computation processing program was executed. The CPU 41 then stores once again in the RAM 42 the travel distance B to which the travel distance S has been added. Note that the travel distance B indicates the cumulative value (a first travel distance) of the distances that the own vehicle 61 has traveled in a state in which the automatic deceleration control of the deceleration inter-vehicular distance system is in operation. The travel distance B is initialized along with the travel distance A when the deceleration control distance computation processing program is executed for the first time and when a specified operation by the user has been accepted by the operation portion 14.

Next, at S7, the CPU 41 determines, based on the vehicle speed of the own vehicle 61 that was acquired at S1, whether or not the speed of the own vehicle 61 changed during a specified period (for example, 10 seconds) before the automatic deceleration control by the deceleration inter-vehicular distance system that is currently in operation was started.

In a case where it is determined that the speed of the own vehicle 61 changed during the specified period before the automatic deceleration control by the deceleration inter-vehicular distance system that is currently in operation was started (YES at S7), a determination is made that the inter-vehicular distance between the own vehicle 61 and the vehicle ahead 62 has become within the set inter-vehicular distance, in accordance with a factor that is based on the own vehicle 61, and that the automatic deceleration control by the deceleration inter-vehicular distance system has been started, so the deceleration control distance computation processing program is terminated.

On the other hand, in a case where it is determined the speed of the own vehicle 61 did not change during the specified period before the automatic deceleration control by the deceleration inter-vehicular distance system that is currently in operation was started (NO at S7), a determination is made that the inter-vehicular distance between the own vehicle 61 and the vehicle ahead 62 has become within the set inter-vehicular distance, in accordance with a factor that is based on the vehicle ahead 62, and that the automatic deceleration control by the deceleration inter-vehicular distance system has been started, so the processing program advances to S8.

At S8, the CPU 41 reads a travel distance C, which is a variable, from the RAM 42, then adds to the value of the travel distance C that it has read the distance S that the own vehicle 61 has traveled since the previous time that the deceleration control distance computation processing program was executed. The CPU 41 then stores once again in the RAM 42 the travel distance C to which the travel distance S has been added. Note that the travel distance C indicates the cumulative value (a second travel distance) of the distances that the own vehicle 61 has traveled in a state in which the automatic deceleration control of the deceleration inter-vehicular distance system is in operation in accordance with a factor that is based on the vehicle ahead 62. The travel distance C is initialized along with the travel distance A and the travel distance B when the deceleration control distance computation processing program is executed for the first time and when a specified operation by the user has been accepted by the operation portion 14.

Note that the travel distance A, the travel distance B, and the travel distance C for which the addition processing is performed at S4, S6, and S8 are used in the diagnosing of the driver's operation of the vehicle by the vehicle operation diagnosis processing program, which is described later (refer to FIG. 5). Furthermore, the case in which the automatic deceleration control of the deceleration inter-vehicular distance system is operated in accordance with a factor that is based on the vehicle ahead 62 corresponds to a case in which, for example, the inter-vehicular distance has become too short because the vehicle ahead 62 has decelerated or stopped while the own vehicle 61 is in a state of traveling at a constant speed.

Next, the vehicle operation diagnosis processing program that is executed in the navigation device 1 that has the configuration that is described above will be explained based on FIG. 5. FIG. 5 is a flowchart of the vehicle operation diagnosis processing program according to the present embodiment. The vehicle operation diagnosis processing program is a program that is executed in a case where the adaptive cruise control is turned on, in a case where a specified operation by the user has been accepted by the operation portion 14, at specified time intervals (for example, once every twenty-four hours), or the like, and it diagnoses whether or not a vehicle operation that the driver performs while driving is appropriate in terms of safety, based on the inter-vehicular distance.

First, at S21, the CPU 41 reads from the RAM 42 the travel distance A, the travel distance B, and the travel distance C, which are variables. Note that the travel distance A is the cumulative value of the distances that the own vehicle 61 has traveled at a speed that is not less than the operation condition speed of the deceleration inter-vehicular distance system. The travel distance B is the cumulative value of the distances that the own vehicle 61 has traveled in a state in which the automatic deceleration control of the deceleration inter-vehicular distance system is in operation. The travel distance C is the cumulative value of the distances that the own vehicle 61 has traveled in a state in which the automatic deceleration control of the deceleration inter-vehicular distance system is in operation in accordance with a factor that is based on the vehicle ahead 62.

Next, at S22, the CPU 41 computes the ratio X based on the travel distance A, the travel distance B, and the travel distance C that were read at S21. The CPU 41 computes the ratio X by subtracting the distance traveled by the own vehicle 61 with the automatic deceleration control by the deceleration inter-vehicular distance system in operation according to a factor that is based on the vehicle ahead 62 from the distance traveled with the automatic deceleration control by the deceleration inter-vehicular distance system in operation, then dividing the result by the distance traveled at not less than the operation condition speed of the deceleration inter-vehicular distance system. In concrete terms, the ratio X is computed by equation (1) below.

$$X = (\text{travel distance } B - \text{travel distance } C)/\text{travel distance } A \quad (1)$$

Note that the ratio X is the ratio of the distance over which the automatic deceleration control by the deceleration inter-vehicular distance system is operated based on a factor of the own vehicle 61 to the distance that the own vehicle 61 has traveled in a state in which the automatic deceleration control by the deceleration inter-vehicular distance system can be operated.

Next, at S23, the CPU 41 performs the diagnosis of the driver's operation of the vehicle. Specifically, the CPU 41 compares the ratio X that was computed at S22 to the driving diagnosis judgment standards that are stored in the vehicle operation diagnosis determination table 32 (FIG. 2), then determines the diagnosis result based on whether or not the set driving diagnosis judgment standards have been met. The CPU 41 then uses the liquid crystal display 15 and the speaker 16 to provide guidance in the form of a message that corresponds to the diagnosis result that has been determined.

Figure 6:
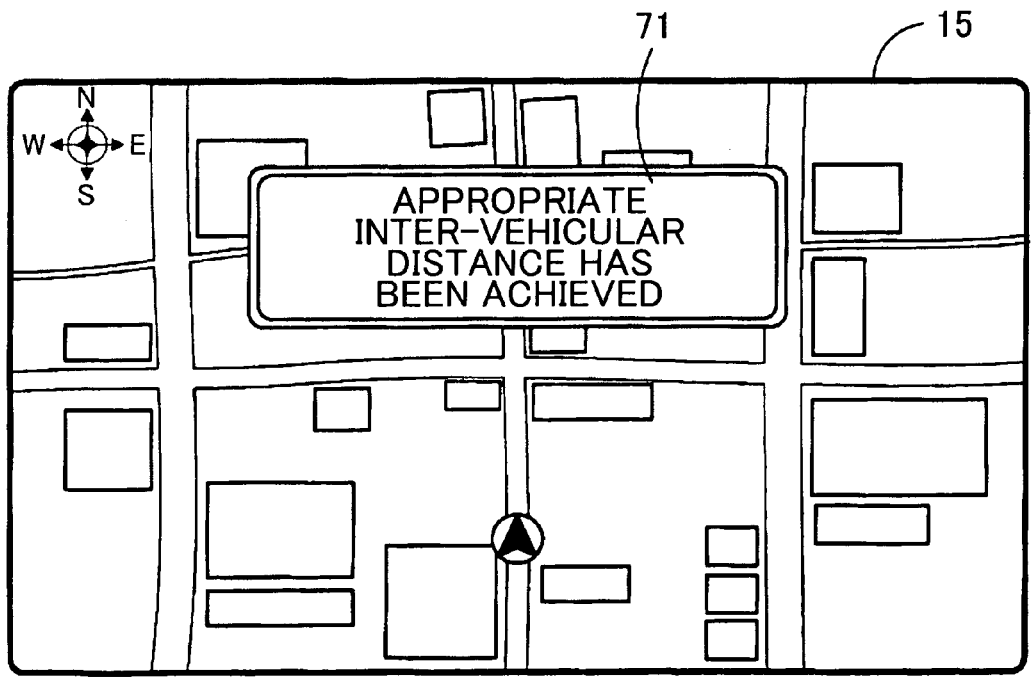
FIG. 6 is a figure that shows a diagnosis result guidance screen that is displayed on a liquid crystal display.

Specifically, in a case where the computed ratio X is less than a specified ratio (for example, ten percent), the CPU 41 diagnoses that the own vehicle 61 is being driven safely and provides guidance saying that an appropriate inter-vehicular distance has been achieved, so that the driver will evaluate his driving as safe. FIG. 6 is a figure that shows a diagnosis result guidance screen that is displayed on the liquid crystal display 15 at S23. As shown in FIG. 6, in a case where the computed ratio X is less than the specified ratio, the message "Appropriate inter-vehicular distance has been achieved" is displayed in a window 71 that is disposed on a map screen, so that the driver will evaluate his driving as safe.

On the other hand, in a case where the computed ratio X is not less than the specified ratio (for example, ten percent), the navigation ECU 13 diagnoses that the own vehicle 61 is not being driven safely and displays the message "Adjust to appropriate inter-vehicular distance" in the window 71 that is disposed on the map screen, in order to encourage safe driving. Thus it is possible to encourage the driver to drive safely in a way that ensures a sufficient inter-vehicular distance.

As described in detail above, the navigation device 1 according to the present embodiment, in accordance with a method by which the navigation device 1 diagnoses vehicle operation, and in accordance with the computer programs that are executed by the navigation ECU 13 of the navigation device 1, computes the ratio X by subtracting the distance traveled by the own vehicle 61 with the automatic deceleration control by the deceleration inter-vehicular distance system in operation according to a factor that is based on the vehicle ahead 62 from the distance traveled with the automatic deceleration control by the deceleration inter-vehicular distance system in operation, then dividing the result by the distance traveled at not less than the operation condition speed of the deceleration inter-vehicular distance system (S22). In a case where the computed ratio X is less than the specified ratio (for example, ten percent), the navigation device 1 diagnoses that the vehicle is being driven safely and makes the evaluation the safe driving is being performed (S23). Therefore, in a case where the diagnosis of the driver's operation of the vehicle is performed with respect to the inter-vehicular distance in a vehicle in which a deceleration inter-vehicular distance system for controlling the inter-vehicular distance between the user's own vehicle and the vehicle ahead is installed, it is possible to exclude from the diagnosis a case in which the automatic deceleration control is operated in accordance with a factor that is based on the vehicle ahead. Accordingly, it is possible to evaluate appropriately, in terms of safety, the driver's operation of the vehicle with respect to the inter-vehicular distance. It is also possible to give the driver motivation to continue driving safely.

Furthermore, the diagnosis of the driver's operation of the vehicle is performed using the ratio of the distance over which the automatic deceleration control by the deceleration inter-vehicular distance system has been operated based on a factor of the user's own vehicle to the distance that the user's own vehicle has traveled in a state in which the automatic deceleration control by the deceleration inter-vehicular distance system can be operated, so it is possible to evaluate the driver's operation of the vehicle appropriately and to prevent a negative diagnosis result from being determined in spite of the fact that the driver of the user's own vehicle has done nothing wrong.

Moreover, because the diagnosis result is provided as guidance to the driver through the liquid crystal display 15 and the speaker 16, it is possible to make the driver more conscious of highly safe vehicle operation and to give the driver motivation to continue driving safely.

Note that the present invention is not limited to the embodiment that is described above, and it is obvious that various improvements and modifications can be made within the scope of the present invention.

For example, a configuration may also be used in which the diagnosis results are added up as points. Specifically, a configuration may also be used in which a storage area is provided that stores a number of points for each user, and a specified number of points are added in a case where it is determined that the ratio X that is computed in the processing at S23 is less than the specified ratio (for example, ten percent).

Furthermore, although the present embodiment has been explained using an example in which the deceleration control type of inter-vehicular distance control system (the deceleration inter-vehicular distance system) is used as the inter-vehicular distance control system for controlling the inter-vehicular distance between the user's own vehicle and the vehicle ahead, a different inter-vehicular distance control system may also be used. For example, a conforming type of inter-vehicular distance control system or the like may be used.

Moreover, in the present embodiment, the diagnosis of the vehicle operation is performed based on the ratio X that is computed by subtracting the distance traveled by the user's own vehicle with the automatic deceleration control by the deceleration inter-vehicular distance system in operation according to a factor that is based on the vehicle ahead from the distance traveled with the automatic deceleration control by the deceleration inter-vehicular distance system in operation, then dividing the result by the distance traveled at not less than the operation condition speed of the deceleration inter-vehicular distance system. However, the diagnosis of the vehicle operation may also be performed based on a ratio that is computed by subtracting the distance traveled with the automatic deceleration control by the deceleration inter-vehicular distance system in operation according to a factor that is based on the vehicle ahead from the distance traveled with the automatic deceleration control by the deceleration inter-vehicular distance system in operation, then dividing the result by the total distance that the user's own vehicle has traveled.

Furthermore, in the present embodiment, the diagnosis of the vehicle operation is performed based on the ratio X of the travel distances, but the diagnosis of the vehicle operation may also be performed based on a ratio of lengths of time that the user's own vehicle has spent traveling or a ratio of numbers of times that the user's own vehicle has traveled.

For example, in a case where the diagnosis of the vehicle operation is performed based on the ratio of the lengths of time that the user's own vehicle has spent traveling, the CPU 41, at S4, S6, and S8, respectively, acquires a length of time that the user's own vehicle traveled at a speed not less than the operation condition speed of the deceleration inter-vehicular distance system, a length of time that the automatic deceleration control by the deceleration inter-vehicular distance system was in operation, and a length of time that the automatic deceleration control by the deceleration inter-vehicular distance system was in operation in accordance with a factor that is based on the vehicle ahead. Then, at S23, the CPU 41 performs the diagnosis of the vehicle operation based on a ratio X' that is computed by subtracting the length of time that the automatic deceleration control by the deceleration inter-vehicular distance system was in operation in accordance with a factor that is based on the vehicle ahead from the length of time that the automatic deceleration control by the deceleration inter-vehicular distance system was in operation, then dividing the result by the length of time that the user's own vehicle traveled at a speed not less than the operation condition speed of the deceleration inter-vehicular distance system.

Furthermore, in a case where the diagnosis of the vehicle operation is performed based on the ratio of the numbers of times that the user's own vehicle has traveled, the CPU 41, at S4, S6, and S8, respectively, acquires a number of times that the user's own vehicle has traveled at a speed not less than the operation condition speed of the deceleration inter-vehicular distance system, a number of times that the user's own vehicle has traveled with the automatic deceleration control by the deceleration inter-vehicular distance system in operation, and a number of times that the user's own vehicle has traveled with the automatic deceleration control by the deceleration inter-vehicular distance system in operation in accordance with a factor that is based on the vehicle ahead. Then, at S23, the CPU 41 performs the diagnosis of the vehicle operation based on a ratio X" that is computed by subtracting the number of times that the user's own vehicle has traveled with the automatic deceleration control by the deceleration inter-vehicular distance system in operation in accordance with a factor that is based on the vehicle ahead from the number of times that the user's own vehicle has traveled with the automatic deceleration control by the deceleration inter-vehicular distance system in operation, then dividing the result by the number of times that the user's own vehicle has traveled at a speed not less than the operation condition speed of the deceleration inter-vehicular distance system.

What is claimed is:

1. A vehicle operation diagnosis device that diagnoses a driver's vehicle operation in a vehicle that is provided with an inter-vehicular distance control system that, in a case where an inter-vehicular distance between the driver's own vehicle and a vehicle ahead that is moving forward ahead of the driver's own vehicle is within a specified distance, controls the inter-vehicular distance between the driver's own vehicle and the vehicle ahead by performing deceleration control of the driver's own vehicle, the vehicle operation diagnosis device comprising:
   a processor;
   a first driving distance acquisition unit that acquires a first driving distance when the driver's own vehicle has traveled in a state in which the deceleration control by the inter-vehicular distance control system was in operation;
   a second driving distance acquisition unit that acquires a second driving distance when the driver's own vehicle has traveled in a state in which the deceleration control by the inter-vehicular distance control system was in operation based on the inter-vehicular distance between the driver's own vehicle and the vehicle ahead being within the specified distance in accordance with a factor that is based on the vehicle ahead;
   a ratio computation unit that computes a ratio of the difference between the first driving distance and the second driving distance to a driving distance that the driver's own vehicle has traveled at a predetermined speed or more; and
   a vehicle operation diagnosis unit that diagnoses, via the processor, the driver's vehicle operation based on the ratio computed by the ratio computation unit.

2. The vehicle operation diagnosis device according to claim 1, wherein
   the ratio computation unit further computes a ratio of the difference between a first driving number of times when the driver's own vehicle has traveled in a state in which the deceleration control by the inter-vehicular distance control system was in operation and a second driving number of times when the driver's own vehicle has traveled in a state in which the deceleration control by the inter-vehicular distance control system was in operation based on the inter-vehicular distance between the driver's own vehicle and the vehicle ahead being within the specified distance in accordance with a factor that is based on the vehicle to a number of times that the driver's own vehicle has traveled under a specified condition,
   the vehicle operation diagnosis unit further diagnoses the driver's vehicle operation based on the ratio of the difference between the first driving number of times and the second driving number of times to the number of times that the driver's own vehicle has traveled under the specified condition.

3. The vehicle operation diagnosis device according to claim 2, wherein
   the inter-vehicular distance control system executes the deceleration control on the condition that the driver's own vehicle is traveling at not less than a specified speed, and
   the specified condition is that the driver's own vehicle has traveled at not less than the specified speed.

4. The vehicle operation diagnosis device according to claim 1, further comprising:
   a diagnosis result guidance unit that provides guidance with respect to a result of the diagnosis of the driver's vehicle operation by the vehicle operation diagnosis unit.

5. A processor-implemented vehicle operation diagnosis method that diagnoses a driver's vehicle operation in a vehicle that is provided with an inter-vehicular distance control system that, in a case where an inter-vehicular distance between the driver's own vehicle and a vehicle ahead that is moving forward ahead of the driver's own vehicle is within a specified distance, controls the inter-vehicular distance between the driver's own vehicle and the vehicle ahead by performing deceleration control of the driver's own vehicle, the vehicle operation diagnosis method comprising the steps of:
   acquiring a first driving distance when the driver's own vehicle has traveled in a state in which the deceleration control by the inter-vehicular distance control system was in operation;
   acquiring a second driving distance when the driver's own vehicle has traveled in a state in which the deceleration control by the inter-vehicular distance control system was in operation based on the inter-vehicular distance between the driver's own vehicle and the vehicle ahead being within the specified distance in accordance with a factor that is based on the vehicle ahead;
   computing a ratio of the difference between the first driving distance and the second driving distance to a driving distance that the driver's own vehicle has traveled at a predetermined speed or more; and
   diagnosing, via the processor, the driver's vehicle operation based on the computed ratio.

6. A non-transitory computer readable medium storing a computer program that, when executed by a processor, causes the processor to diagnose a driver's vehicle operation in a vehicle that is provided with an inter-vehicular distance control system that, in a case where an inter-vehicular distance between the driver's own vehicle and a vehicle ahead that is moving forward ahead of the driver's own vehicle is within a specified distance, controls the inter-vehicular distance between the driver's own vehicle and the vehicle ahead by performing deceleration control of the driver's own vehicle, the computer program causing the processor to perform the functions of:
   acquiring a first driving distance when the driver's own vehicle has traveled in a state in which the deceleration control by the inter-vehicular distance control system was in operation;
   acquiring a second driving distance when the driver's own vehicle has traveled in a state in which the deceleration control by the inter-vehicular distance control system was in operation based on the inter-vehicular distance between the driver's own vehicle and the vehicle ahead being within the specified distance in accordance with a factor that is based on the vehicle ahead;
   computing a ratio of the difference between the first driving distance and the second driving distance to a driving distance that the driver's own vehicle has traveled at a predetermined speed or more; and
   diagnosing the driver's vehicle operation based on the computed ratio.

* * * * *